Patented Jan. 24, 1939

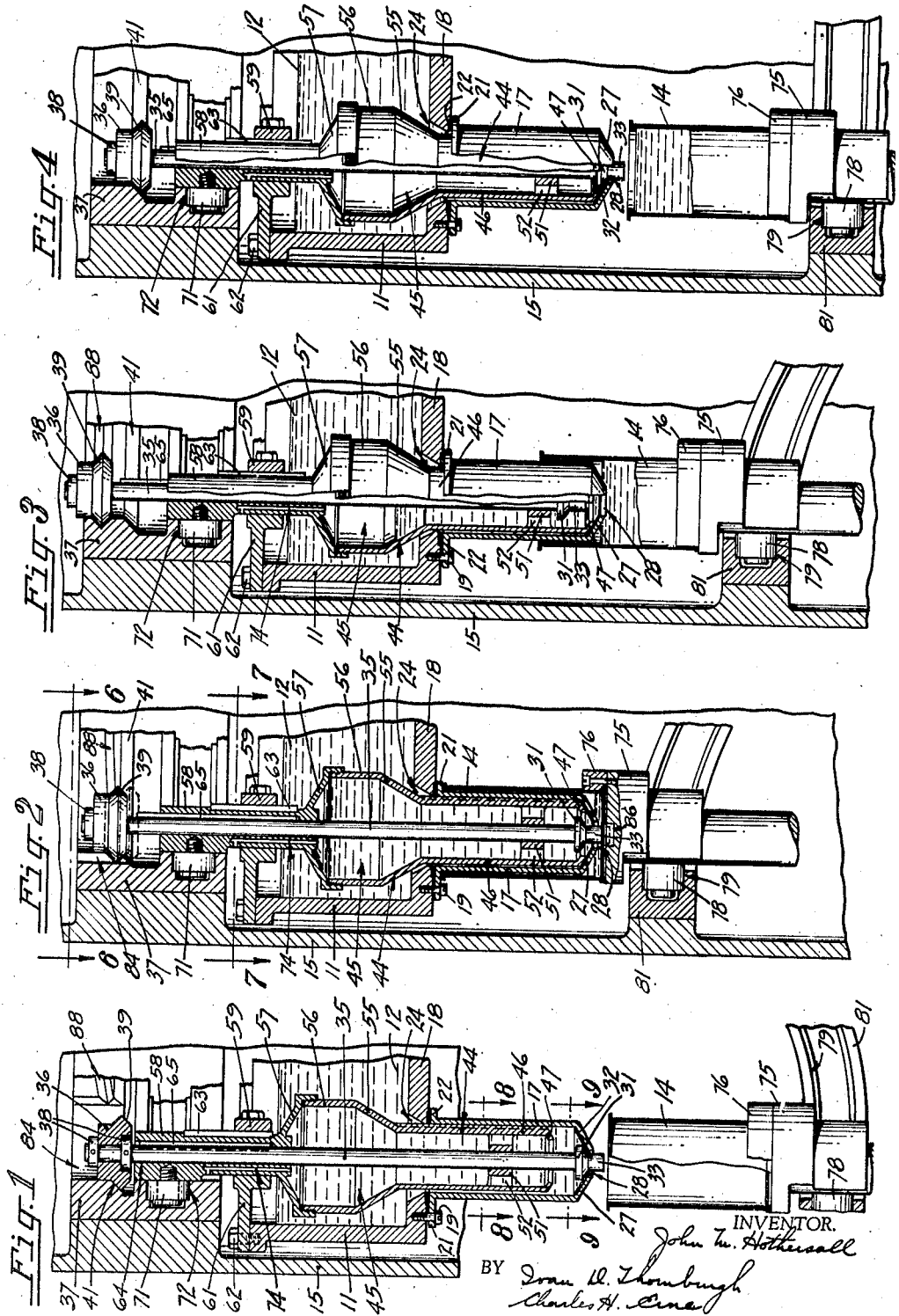

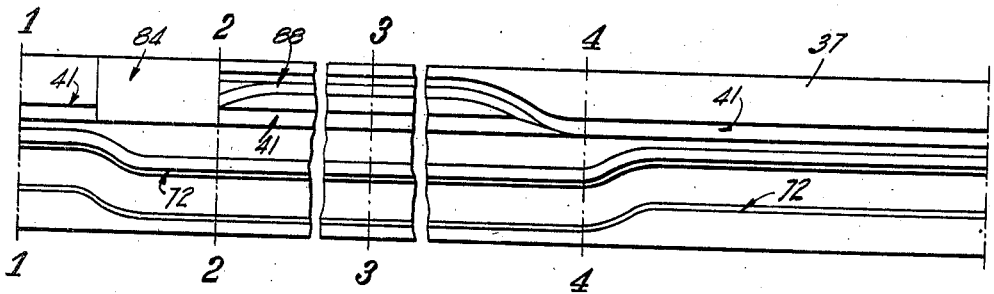
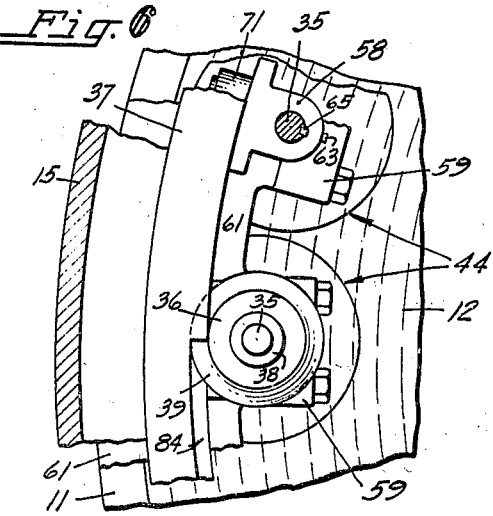
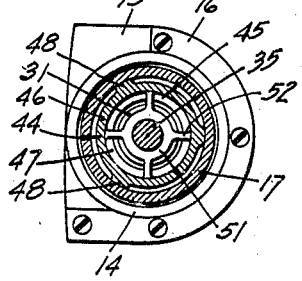
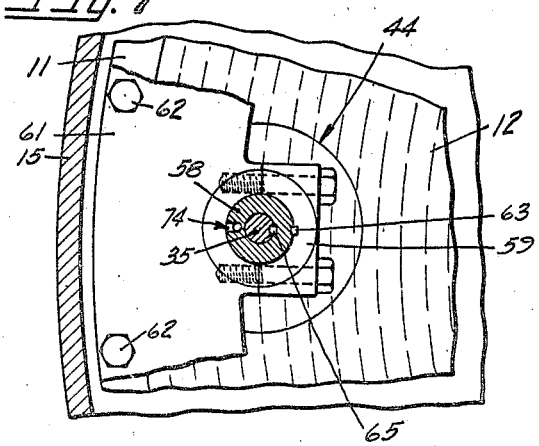
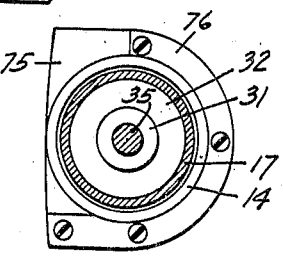

2,144,628

UNITED STATES PATENT OFFICE 2,144,628

CONTAINER FILLING MACHINE

John M. Hothersall, Brooklyn, N. Y., assignor to American Can Company, New York, N. Y., a corporation of New Jersey Application September 24, 1936, Serial No. 102,413

8 Claims. (Cl. 226—97)

The present invention relates to container or can filling machines and has particular reference to devices for measuring out a predetermined charge of liquid and for filling the measured charge into a can through a discharge orifice which during the filling operation is maintained at a level slightly below the surface level of the liquid as the latter rises in the can so that the liquid will flow into the can gently and quietly without agitation or foaming. The machine is particularly adapted for filling effervescent liquids and beverages such as beer into containers, but is equally susceptible of use when filling any desired liquid into suitable containers.

An object of the invention is the provision of a machine for filling liquids into cans wherein the liquid prior to filling is measured out into a measuring element which is introduced into the can for the filling operation, the measured charge of liquid being discharged through an orifice which is constantly maintained by a receding movement between measuring element and can at a level slightly below the surface level of the liquid as it rises in the can so that the liquid will flow gently and quietly without agitation or foaming.

Another object is the provision of such a filling machine wherein the measuring element is associated with a nozzle having an orifice and also an adjacent part which cooperates with a plurality of members in two valve functions, one of which is for segregating a measured charge of liquid in the measuring element in close proximity to the orifice of the nozzle and the other for effecting discharge of this segregated charge of liquid into a can to be filled at the proper time and this without undue agitation or foaming of the liquid.

Numerous other objects and advantages of the invention will be apparent as it is better understood from the following description, which, taken in connection with the accompanying drawings, discloses a preferred embodiment thereof.

Referring to the drawings:

Figures 1, 2, 3 and 4 are fragmentary vertical sectional views of principal parts of a can filling machine embodying the instant invention, the various views showing different positions of filling head parts and a can during the filling of the latter.

Fig. 5 is a schematic view illustrating a developed layout of a cam for operating certain valve devices embodied in the filling head;

Figs. 6 and 7 are enlarged horizontal sections taken substantially along the lines 6—6 and 7—7 in Fig. 2; and Figs. 8 and 9 are enlarged horizontal sections of a filling head taken substantially along the lines 8—8 and 9—9 in Fig. 1.

A preferred embodiment of the instant invention which is disclosed in the drawings is incorporated in a well known type of multiple head filling machine for filling liquids into cans such as for example, the machine shown in United States Patent 1,523,607, issued January 20, 1925, to F. W. Prael on "Filling machine". Only sufficient of such a filling machine is illustrated herein to impart a clear understanding of the relation of the invention to the machine and to show the cooperation between associated parts.

Such a disclosure embodies a cylindrical tank or reservoir 11 (Figs. 1, 2, 3, 4, 6 and 7) adapted to contain a filling liquid 12 which is to be filled into cans 14. The reservoir is supported and continuously rotated in any suitable manner within a cylindrical housing 15 which may be a part of the main frame of the filling machine.

Filling of the liquid 12 into a can 14 is accomplished by way of an elongated tubular filling head or nozzle 17 which depends from a bottom wall 18 of the reservoir 11. The nozzle is secured in place by screws 19 which extend through an outwardly bent flange 21 formed on the nozzle at its upper edge, the screws being threaded into the reservoir bottom wall. A gasket 22 is preferably interposed between flange and bottom wall to prevent leakage of the liquid at the joint. Communication is provided between reservoir and nozzle by way of an opening 24 formed in the reservoir bottom wall in concentric alignment with the vertical axis or center line of the nozzle so that the liquid can pass into the nozzle.

A liquid discharge valve unit is provided in the lower or discharge end of the nozzle 17 to permit discharge of the liquid. This end of the nozzle is formed with an inverted conical wall section 27 having a liquid discharge port or orifice 28 disposed concentric with the axis of the nozzle. Opening and closing of the orifice to control the discharge of the liquid is effected by a lift valve 31 disposed inside the nozzle and which seats against a gasket 32 secured to the inner face of the conical wall section 27. A depending projection 33 formed on the bottom of the valve extends into the discharge orifice 28 and protrudes below the end of the nozzle.

The valve 31 is formed on the lower end of a vertical rod or valve stem 35 which extends up through the center of the nozzle 17 and carries a cam roller 36 which is rotatably mounted on its upper end. The valve is moved vertically to open the orifice 28 at the proper time by cooperation of its cam roller 36 with a stationary continuous ring cam 37. Cam 37 is secured to the inside of the main frame housing 15 above the reservoir.

Collars 38 are pinned to the upper end of the rod and loosely hold the roller 35 in place thereon. This roller is provided with a V-shaped guiding surface 39 which engages against a tapered cam track 41 (see also Fig. 5) formed in the cam 37 and which holds the valve 31 seated against the gasket 32 until time for opening, as will be hereinafter explained.

Provision is made for measuring out and for segregating a predetermined charge of the liquid contained in the nozzle 17 and the reservoir 11 preparatory to opening the lift valve 31. For this purpose a vertically movable tubular casing or measuring element 44 enclosing a measuring chamber 45 is disposed partly in the nozzle and partly in the reservoir below the level of the liquid 12. The lower portion of the casing extends into the nozzle and comprises a vertically disposed cylindrical wall section 46. This wall section terminates at its lower edge in an inwardly turned flange 47 constituting a valve member which in one vertical position of the measuring element is adapted to engage the nozzle valve seat gasket 32 adjacent the valve 31. The bottom of the measuring element adjacent the valve flange is open.

The exterior surface of the measuring element wall section 46 is formed with a plurality of vertical ribs 48 (in Fig. 8) which slide on the inside surface of the nozzle when the element is moved vertically. These ribs serve as guides for keeping the measuring element centrally located in the nozzle. A bearing 51 disposed inside this part of the measuring element and supported by spider arms 52 connected with the wall section 46 serves as a guide for the lower end of the valve rod 35.

The upper portion of the measuring element where it is disposed in the reservoir 11 has its casing wall section 46 merged into a flared wall section 55 (Figs. 1, 2, 3 and 4) which extends up into a vertical wall section 56 forming an enlarged portion of the measuring chamber. The top of the casing is closed by a cap 57 which is threadedly secured to the section 56.

A casing guide stem 58 is formed on the cap 57 and its longitudinal center corresponds with and has vertical movement along the longitudinal center line of the measuring element 44. This stem is supported in a capped split bearing 59 (see also Figs. 6 and 7) which is formed in a ring 61 secured by screws 62 to the top edge of the reservoir 11. A feather 63 fastened in the side of the stem prevents the measuring element from turning in the nozzle during its vertical movement. This stem also guides the upper end of the valve rod 35, a bore 64 being provided in the stem for this purpose. A feather 65 in the valve rod prevents its turning.

Vertical movement of the measuring element 44 in one direction is effected at the proper time to cause a predetermined quantity of the liquid in the reservoir and the nozzle to flow into the measuring chamber, and in the opposite direction to segregate or trap the liquid so that only this measured quantity will be discharged into a can 14 when the valve 31 is opened. This movement of the measuring element is accomplished by cam action operating through the medium of a roller 71 (Figs. 1, 2, 3 and 4) which is mounted on the guide stem 58. The roller engages within a cam track 72 (see also Fig. 5) formed in the stationary ring cam 37.

Thus as the reservoir 11 is rotated through its cycle the cam track 72 acts on the roller 71 to first raise the measuring element 44 so that its lower valve flange 47 separates from the valve seat gasket 32 as shown in Fig. 1. Liquid then flows into the measuring chamber 45 through the open bottom of the element. A vent conduit 74 formed in the cap guide stem 58 and leading from the chamber to the atmosphere above the surface level of the liquid in the reservoir permits the liquid to completely fill the measuring chamber and rise in the vent conduit to the level of the reservoir liquid.

This construction of measuring element and the manner of filling from the bottom insures that the liquid will enter quietly and smoothly without any agitation. It also permits filling without foaming of liquids which otherwise readily foam when slightly agitated. These characteristics insure accurate measurement of the liquid.

When the measuring chamber 45 is filled the cam track 72 then acts on the roller 71 to lower the measuring element into its original position where its valve flange 47 is brought into tight sealing engagement against the valve seat gasket 32 as shown in Fig. 2. This valve seating cuts off communication between the measuring chamber and the surrounding liquid in nozzle and reservoir, thereby segregating the liquid in the chamber. This completes the measuring and segregating operation.

A can 14 to be filled with the liquid thus segregated, is supported on a lifter pad 75 (Figs. 1, 2, 3, 4, 8 and 9) disposed under the nozzle 17, the can being placed on the pad in any suitable manner such as for example, in the manner disclosed in the patent hereinbefore mentioned. A can centralizing ring 76 secured to the top of the lifter pad locates and holds the positioned can in vertical and axial alignment with the nozzle.

The lifter pad 75, after receiving a can, is raised vertically by cam action to bring the can into a position where it telescopically surrounds the nozzle 17, the nozzle extending into the can. For this purpose the lifter pad is provided with a cam roller 78 which engages within a cam track 79 of a stationary continuous ring cam 81 secured to the inside surface of the main frame housing 15. Thus as the lifter pad is carried around with the rotation of the reservoir 11 the cam acts on the roller 78 to raise and lower the lifter pad at the proper time.

Raising of the lifter pad 75 from its lowest position as shown in Fig. 1 to its highest position as shown in Fig. 2 takes place in a short arc of travel along the cam. At the highest position of the lifter pad the can entirely surrounds the nozzle. The length of the nozzle is proportioned so that in this position of the lifter pad the discharge end of the nozzle will almost engage against the bottom of the can, only a slight space intervening between them.

During this lifting movement and as the can approaches its highest position the valve 31 is partially opened to permit the segregated charge of liquid in the measuring chamber 45 to begin to flow into the can. The valve cam roller 36 runs off its cam track 41 and into a recess 84 (Figs. 2, 5 and 6) where it is unconfined. At this time the bottom of the can engages against the projection 33 of the valve 31 and lifts the valve away from its seat gasket 32. This partly opens the nozzle orifice 28 and permits the liquid to begin to flow slowly and gently into the can.

If no can is present on the lifter pad 75 when the latter is being moved into this highest position, there being no can bottom wall to engage the valve projection 33, the latter enters into a recess 86 (Fig. 2) formed in the top of the lifter pad. The valve 31 therefore remains in its lowered or closed position. This provision prevents accidental discharge and waste of the liquid.

When a can has initially raised the valve 31, as previously described, there is a further opening of the valve and a holding of it in the full open position independently of the can. The initial opening of the valve by engagement with the can raises the cam roller 36 in the recess 84 and brings the roller into horizontal alignment with an elevated V-shaped cam groove 88 formed in the cam 37. The guiding surface 39 of the cam roller enters this groove, as the roller is carried forward by movement of the reservoir 11, and is thereby acted upon to further lift the valve rod 35 so that the projection 33 is disengaged from the can bottom. The cam groove 88 supports the valve rod in this raised and full open position during the filling operation. This permits the liquid to flow into the can at a faster rate of speed.

Prior to disengagement of the valve projection and can bottom the liquid has flowed into the can so slowly that the orifice end of the nozzle is barely submerged below the surface level of the liquid. This position of the orifice relative to the liquid level in the can is thereupon maintained throughout the filling operation so that the accurately measured charge of liquid will be transferred into the can with a minimum of agitation and foaming.

In order to maintain this relation between the nozzle discharge orifice and the level of the liquid in the can, the lifter pad 75 and the can carried thereon is lowered at a speed proportionate to the rate of flow of the liquid into the can. This receding movement is effected by the cam track 79 of the cam 81 and the end of the nozzle 17 having the orifice 28 is kept at a level approximately one-eighth of an inch below the surface level of the liquid as it rises in the can (see Fig. 3).

When the full measured charge of liquid in the measuring chamber is transferred into the can, the cam 81 further lowers the can so that it is clear of the nozzle 17 as shown in Fig. 4. At this time the valve cam roller 36 is directed by the cam groove 88 down and back into the cam track 41. This lowers the valve 31 and hence closes the discharge orifice 28. The parts are now returned to their first positions and the measuring element may again be raised and filled for another filling cycle and for a succeeding can.

It should be understood that the filling operation is performed continuously as the reservoir 11 is rotated within the main frame housing 15. There are a plurality of these filling head units and can lifter pads arranged in a circle relative to the reservoir, as suggested in Fig. 6, to fully cooperate in filling cans as they are successively moved into the machine and placed on the lifter pads, only one of these units being herein described and explained in order to simplify this specification.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for filling liquid into containers, the combination of a reservoir for the liquid, a nozzle for said reservoir, a valve in said nozzle for effecting discharge of the liquid into a container, said valve having a part extending within the container to the bottom thereof and adapted to be initially opened by said container, instrumentalities for further opening said valve and for holding it in such open position independently of the container, a support for the container, and means for bringing the support and the nozzle together thereby moving the container into liquid receiving position telescopically surrounding the nozzle and for effecting a receding movement between the supported container and the nozzle at a speed proportionate to the rate of flow of the liquid into the container, such receding movement keeping the discharge end of the nozzle slightly below the surface level of the liquid in the container as it fills thereby preventing agitation of the liquid while filling.

2. In a machine for filling liquid into containers, the combination of a reservoir for the liquid, a nozzle for said reservoir and having a discharge orifice for dispensing the liquid into a positioned container, a movable measuring element having an apertured seat, mechanism for moving said measuring element relative to said nozzle into a position to cause liquid to flow into it and for moving it into another position where said apertured seat engages against said nozzle adjacent its discharge opening to seal off the measuring element and to segregate a measured charge of liquid contained therein, a valve in said nozzle discharge orifice for closing the same, said valve being operable into a partially open position by engagement of a part thereof with a container located thereunder to receive the measured charge of liquid, and instrumentalities for further and fully opening said valve and for holding it in such full open position.

3. In a machine for filling liquid into containers, the combination of a nozzle, a measuring element located inside of and having axial movement within said nozzle and adapted to receive and segregate a liquid for filling, and a valve located inside of said measuring element and having axial movement relative to both element and nozzle, said valve when in open position permitting discharge of the measured quantity of liquid from said measuring element.

4. In a machine for filling liquid into containers, the combination of a nozzle for the liquid, said nozzle having an inner valve seat, a valve located within said nozzle for engaging said nozzle valve seat to close the nozzle outlet, a measuring element also located within said nozzle and having axial movement therein, said element having an aperture through which liquid flows into the measuring element, means for moving said element into engagement with the valve seat of said nozzle to close said aperture and cut off flow of liquid therein thereby segregating a measured quantity of liquid in the measuring element, and means for opening said valve to discharge the measured quantity of liquid from said measuring element.

5. In a machine for filling liquid into containers, the combination of a reservoir for the liquid, a nozzle in communication with said reservoir for dispensing liquid into a container, said nozzle having an inner valve seat, a valve located within said nozzle for engaging said nozzle valve seat to close the nozzle outlet, a measuring element also located within said nozzle and having axial movement therein, said element having an aperture through which liquid flows into the measuring element from said reservoir, means for moving said element into engagement with the valve seat of said nozzle to close said aperture and cut off flow of liquid into said element thereby segregating a measured quantity of liquid from the liquid in said reservoir, and means for moving said valve from said nozzle seat to discharge the measured quantity of liquid from said measuring element.

6. In a machine for filling liquid into containers, the combination of a nozzle adapted to be disposed within a container for dispensing liquid therein, a valve located within and movable on the longitudinal center of said nozzle for preventing passage of liquid from nozzle to container when in valve closing position, a measuring element also located within said nozzle and having axial movement therein into different positions, said element having an aperture through which liquid flows into the measuring element when in one of its positions, means for moving said element to close said aperture and cut off the flow of liquid thereby segregating a measured quantity of liquid in the measuring element, and means for opening said valve to discharge said measured quantity of liquid into the container.

7. In a machine for filling liquid into containers, the combination of a reservoir for the liquid, a nozzle for said reservoir, a valve in said nozzle for opening and closing the latter, a movable measuring element immersed in and located below the level of the liquid in said reservoir and in alignment with said nozzle and having an apertured seat, said element having venting connection with the space above the liquid in said reservoir, mechanism for moving said measuring element to provide for flow of liquid from said reservoir through said apertured seat during venting of air from the interior of said element and also for bringing said apertured seat into sealing engagement with said nozzle adjacent said valve thereby segregating a measured quantity of liquid in the measuring element, and means for opening said valve to cause discharge of the said measured charge of liquid.

8. In a machine for filling liquid into containers, the combination of a reservoir for the liquid, a nozzle in communication with said reservoir for dispensing liquid into a container, said nozzle having an inner valve seat, a measuring element immersed in and located below the level of the liquid in said reservoir and within said nozzle and having axial movement therein, said element having an aperture through which liquid flows from the reservoir into the said element when the latter is out of engagement with said nozzle valve seat, means for moving said measuring element into engagement with said nozzle valve seat to cut off the flow of liquid therein thereby segregating a measured quantity of liquid in the measuring element, a support for the container, means for bringing the container into position surrounding said nozzle so that the latter is inserted into said container, a valve located inside of said measuring element and having axial movement relative to said element and said nozzle for opening and closing the nozzle, one position of the valve being in engagement with said nozzle valve seat during passage of the liquid into said measuring element and another position of said valve as when out of engagement with said valve seat permitting discharge of the measured quantity of liquid from said measuring element into said container, and means for effecting a receding movement between the supported container and the nozzle at a speed proportionate to the discharge rate of liquid into the container.

JOHN M. HOTHERSALL.